Dec. 10, 1946.  A. F. HOESEL  2,412,334
AIRPLANE CABIN HEATING SYSTEM
Filed July 10, 1944  4 Sheets-Sheet 1
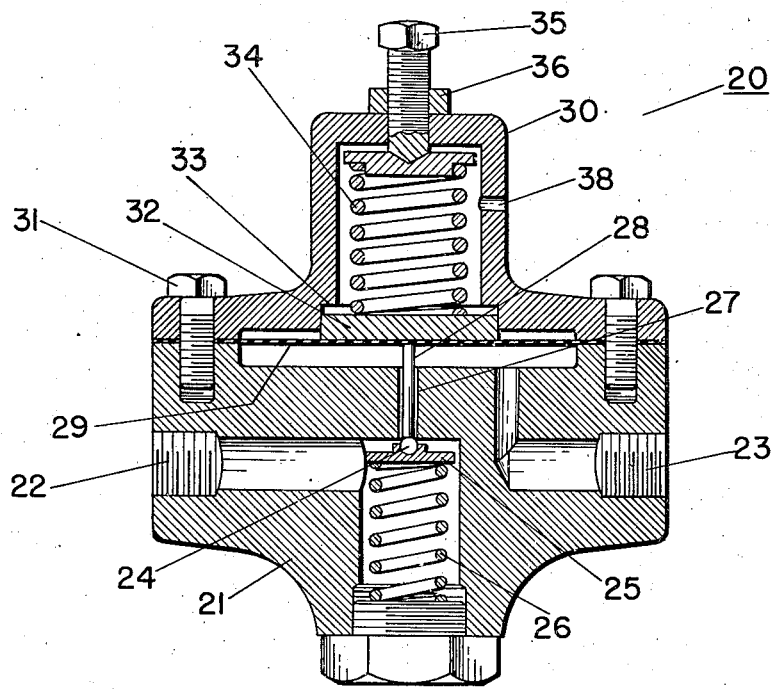
FIG. 1
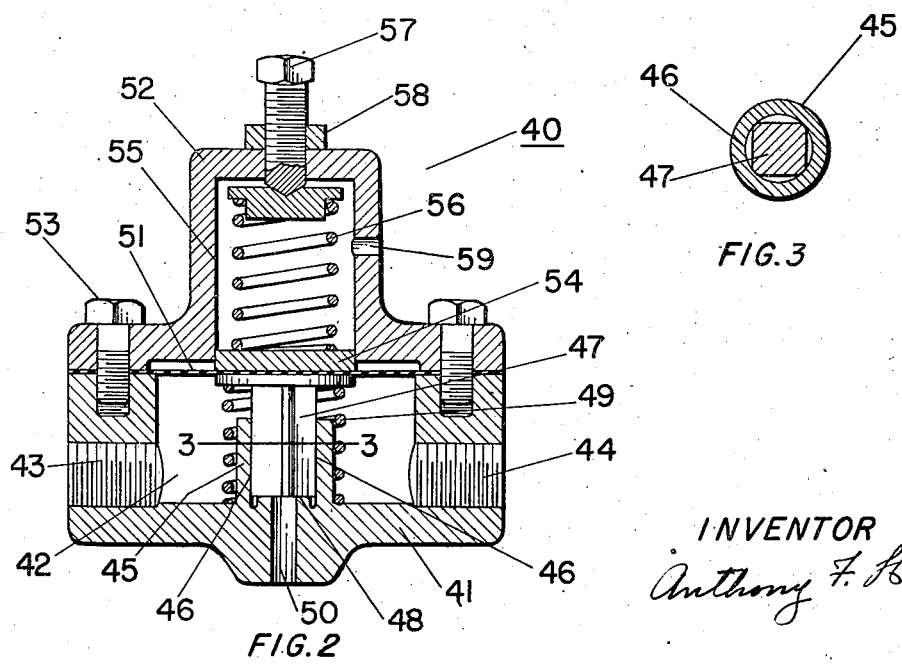
FIG. 2
FIG. 3
INVENTOR
Anthony F. Hoesel Dec. 10, 1946. A. F. HOESEL 2,412,334
AIRPLANE CABIN HEATING SYSTEM
Filed July 10, 1944 4 Sheets-Sheet 2

INVENTOR
Anthony F. Hoesel

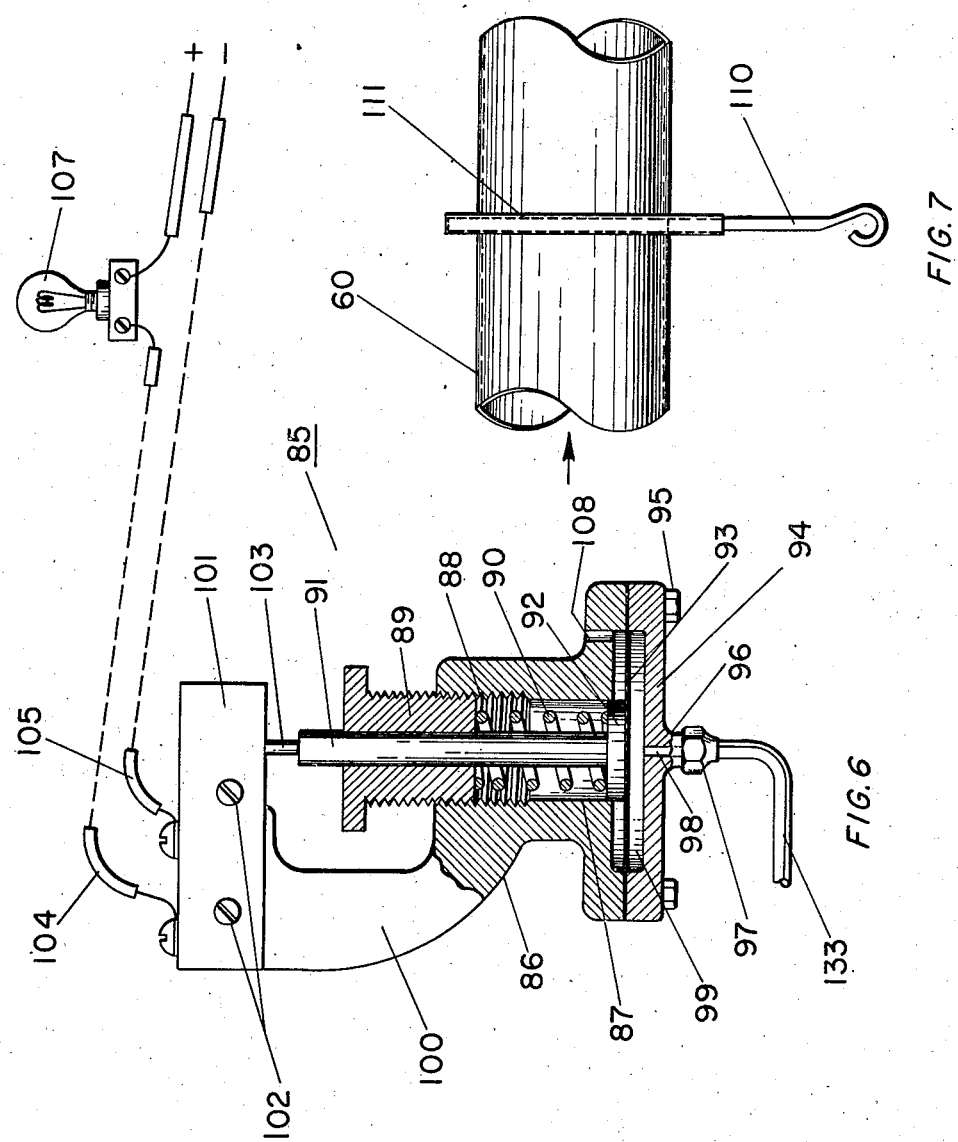

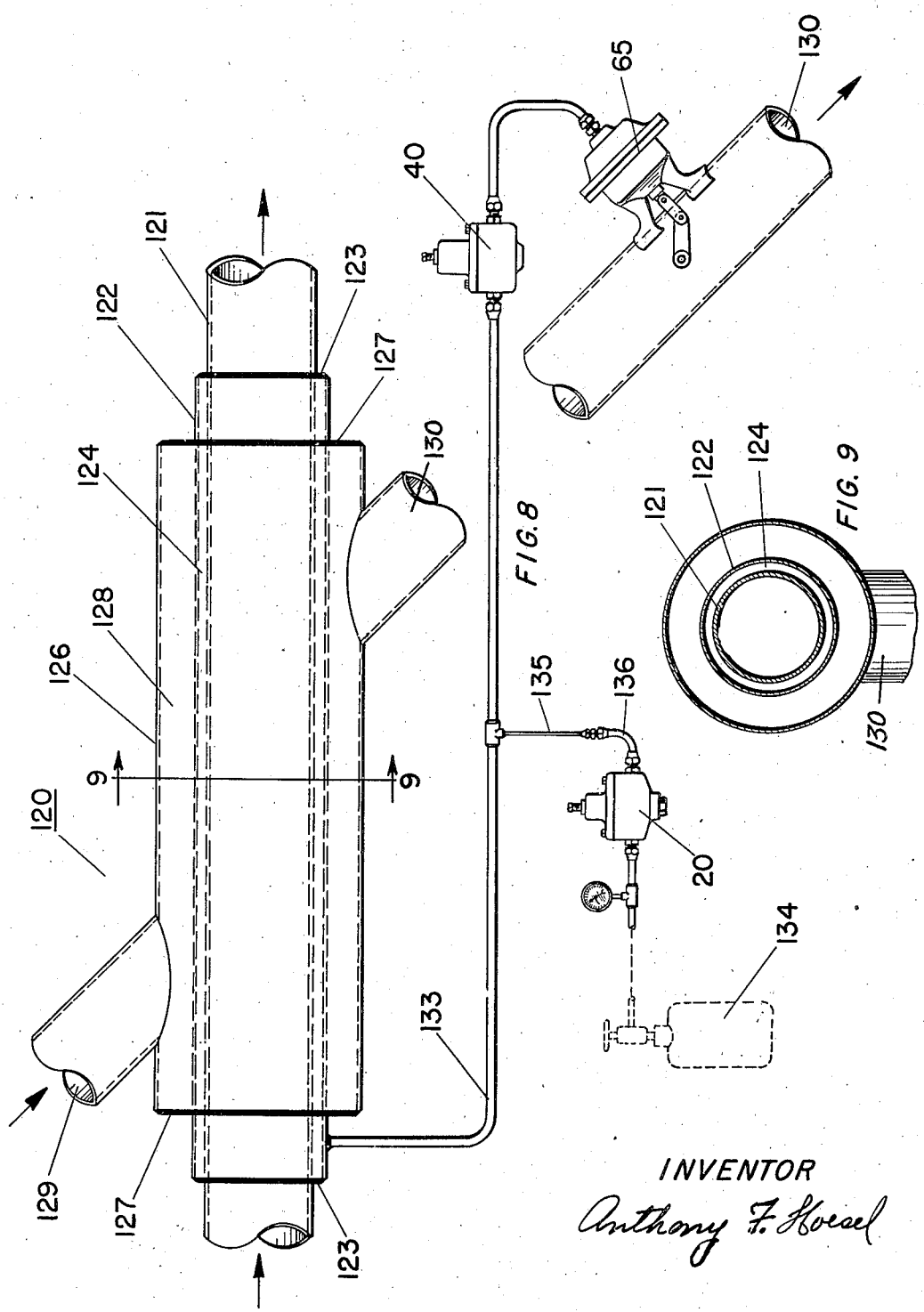

Patented Dec. 10, 1946

2,412,334

UNITED STATES PATENT OFFICE 2,412,334

AIRPLANE CABIN HEATING SYSTEM

Anthony F. Hoesel, Chicago, Ill., assignor to Peerless of America Inc., Chicago, Ill., a corporation of Illinois Application July 10, 1944, Serial No. 544,307

4 Claims. (Cl. 237—2)

The present invention relates to airplane cabin heating by utilizing the exhaust heat rejected by the engine.

Specifically, the invention is concerned with preventing the entrance of exhaust gases, in harmful quantity, to the airplane cabin if, for any reason whatsoever, the exhaust pipe proper should become perforated.

Present day high octane fuels, at exhaust pipe temperatures, have a highly corrosive effect and eventually eat holes in the exhaust pipes, furthermore, in warfare, the possibility of bullet puncture is ever present.

Previous exhaust heaters always had the ever present danger, whenever perforated, of releasing lethal quantities of carbon monoxide into the cabin. Since carbon monoxide is a colorless, odorless gas one volume of which in 800 volumes of air will have fatal results if breathed for about 30 minutes, it is readily seen that protective measures thereagainst are not only desirable but imperative.

In great concentrations, such as would occur with a bullet punctured exhaust heater, the time of fatality, due to carbon monoxide poisoning, might be very short indeed and it is presumptive that certain unexplained fatalities have resulted therefrom in planes so equipped.

An object of the present invention is to prevent the entrance of carbon monoxide, or exhaust gases, into the airplane cabin whenever the exhaust pipe of the heater is perforated.

Another object of the present invention is to automatically close down the heating air supply to the airplane cabin whenever the exhaust pipe of the air heater is perforated.

A further object of the present invention is to provide an automatic signalling means to indicate whenever the exhaust pipe of the air heater is perforated.

Other objects will appear in the following specification and claims.

In the drawings:

Fig. 1 is a cross sectional view of a pressure reducing valve as may be used in the practice of the invention.

Fig. 2 is a cross sectional view of a pressure relief valve as may be used in the practice of the invention.

Fig. 3 is a cross sectional view along line 3—3 of Fig. 2.

Fig. 6 is a view, partly in section, of an automatic signalling means as may be used in the practice of the invention.

Fig. 7 is a view of a manually operated valve means for closing the air flow as may be used in the practice of the invention.

Fig. 8 is a diagrammatic view of an assembly embodying the invention.

Fig. 9 is a cross sectional view, along line 9—9 of Fig. 8.

Figure 4:
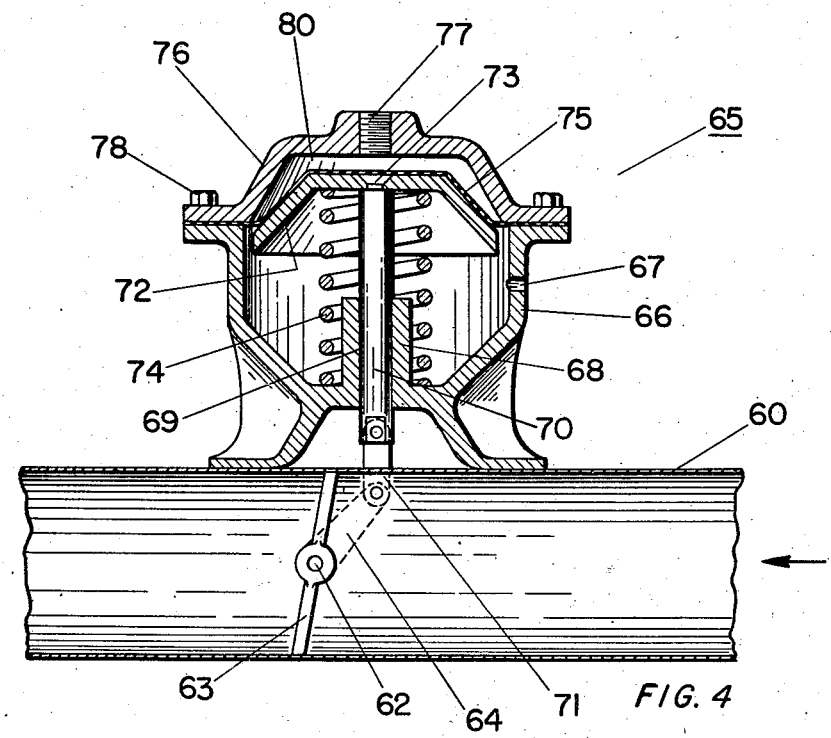
Fig. 4 is a cross sectional view of the automatic valve means, for controlling the heated air flow, as may be used in the practice of the invention.

Referring to the drawings:

In Fig. 1, the pressure reducing valve 20 comprises a body casing 21 having a high pressure inlet 22 and a reduced pressure outlet 23. Between the inlet 22 and outlet 23 is a ball valve 24 mounted in a carrier 25 against which the spring 26 abuts and tends to urge the ball valve 24 towards its seat at the lower end of the bore 27 in which a pusher pin 28 is a loose fit. The upper end of the pusher pin 28 abuts a diaphragm 29, which is clamped between the body 21 and the diaphragm spring chamber 30 by means of the bolts 31. The spring support 32, mounted in the bore 33, is constantly urged against the diaphragm 29 by means of the spring 34, whose compressive strength is adjustable by means of the adjusting screw 35 which has a lock nut 36 for locking the same. The diaphragm spring chamber 30 has a bore 38 which allows the upper side of the diaphragm 29 to be subjected to the ambient pressure.

Assuming the spring 34 adjusted to a given reduced pressure, at the outlet 23, such reduced pressure will, at all times, be reflected as a pressure differential between the ambient pressure and the reduced pressure, since the ambient pressure will, at all times and by means of bore 38, press upon the upper side of the diaphragm 29. If the ambient pressure increases or decreases, the reduced pressure, at the outlet 23, will increase and decrease respectively by the same amount.

In Fig. 2, the pressure relief valve 40 comprises a body 41 having a chamber 42 with through passages 43 and 44. The boss 45 has a bore 46 in which a valve 47 is placed and constantly urged away from its mating seat 48 by means of the valve spring 49. The bore 50 allows the escape of pressure, from the chamber 42, whenever the valve 47 leaves its seat 48. The upper end of the valve 47, abuts a diaphragm 51 which is clamped between the body 41 and the diaphragm spring chamber 52 by means of bolts 53. The spring support 54 plays in the bore 55 and is constantly urged against the diaphragm 51 by means of the spring 56 whose compressive strength is adjustable by means of the adjusting screw 57, which has a lock nut 58 for locking the same. The diaphragm spring chamber 52 has a bore 59 which allows the upper side of the diaphragm 51 to be subjected to the ambient pressure.

Assuming the spring 56 adjusted to a given pressure, in the chamber 42, such pressure will, at all times, be reflected as a pressure differential between the ambient pressure and the pressure within the chamber 42. If the ambient pressure remains constant and the chamber pressure increases, then the diaphragm 51 lifts upward allowing the valve 47 to open and relieve the excess pressure through the bore 50. If the chamber pressure is at a given valve and the ambient pressure decreases, then the total pressure, upon the upper side of the diaphragm 51, decreases and the diaphragm 51 and valve 47 move upwardly thereby relieving the excess pressure differential through the bore 50. If the ambient pressure increases then the total pressure, upon the upper side of the diaphragm 51, increases and therefore a greater pressure must occur, in the chamber 42, before the valve 47 will open.

Figure 5:
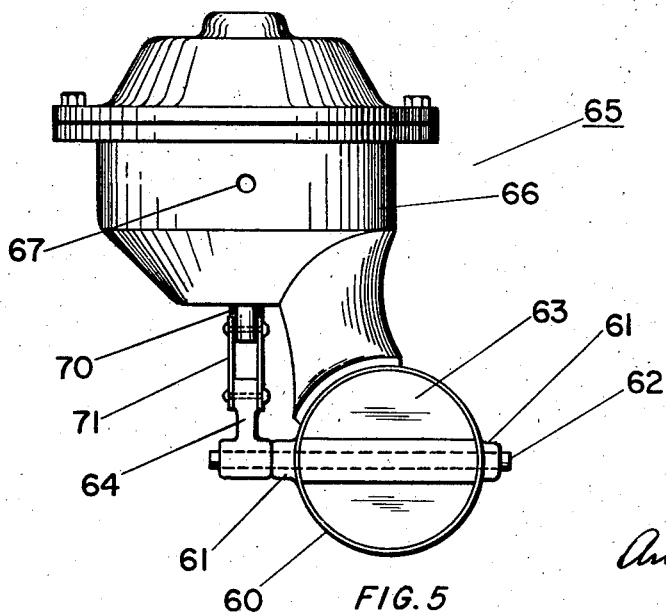
Fig. 5 is an end view of Fig. 4 in the direction of the arrow of Fig. 4.

In Figs. 4 and 5, I show a hot air conduit 60 having journal bearings 61 in which the shaft 62 may be oscillated. A butterfly valve 63 is mounted upon the shaft 62 and oscillated simultaneously therewith to either full open or full closed positions (as shown), by means of the crank arm 64 also mounted upon the shaft 62.

Fastened, to the conduit 60, in some suitable manner or other, is a valve operator 65 comprising a body 66 open to ambient pressure, by means of bore 67, and having a boss 68 with a bore 69 in which a push-pull rod 70 can reciprocate. The lower end, of the push-pull rod 70, connects to the crank arm 64 by means of the floating links 71 suitably pinned thereto as shown.

The diaphragm support 72, riveted to the push-pull rod 70, as shown at 73, is constantly urged, by means of spring 74, against the diaphragm 75, which is clamped, between the body 66 and the pressure chamber cover 76 having a conduit connection bore 77, by means of the bolts 78. The space 80, between the diaphragm 75 and the pressure chamber cover 76, defines a pressure tight chamber. Whenever the pressure, in the chamber 80, reduces to a certain value, the various elements are in the positions shown since the spring 74, then, exerts the preponderant force.

Whenever the pressure, in the chamber 80, exceeds a certain value, the force of the spring 74 is overcome and the diaphragm 75 and the push-pull rod 70 then move downwardly, compressing the spring 74, and move the butterfly valve 63 to wide open position thereby allowing an air flow through the hot air conduit 60.

In Fig. 6, an automatic signalling control 85 comprises a body 86 having a bore 87 threaded at the upper end 88 to engage an adjusting screw 89 serving to vary the length and consequently the pressure of the spring abutting thereagainst. The pusher rod 91 has an enlarged diameter 92, loosely mounted in the bore 87 and abutted by the spring 90, which presses against the diaphragm 93 clamped between the body 86 and the pressure chamber cover 94 by means of bolts 95. The pressure chamber cover has a conduit flare end 96 against which the pressure conduit is pressed by the flare nut 97 thereby making a pressure tight joint. A bore 98 communicates between the pressure conduit and the chamber 99 and transmits the pressure, and variations thereof, residing in the pressure conduit. Suspending from the body 86, and integral therewith, is a switch mounting lug 100 upon which is mounted a Micro switch 101 by means of screws 102. These switches are so universally known that it should suffice to state that a slight movement of the operating stem 103, abutting the push rod 91, results in making or breaking an electric circuit between the electric conductors 104 and 105 connected to some suitable source of electrical energy.

In the present instance, the Micro switch 101 makes an electric circuit whenever the operating stem 103 is pushed upwardly, and breaks the electrical circuit whenever the operating stem 103 is in its downward position. The electrical conductor 104 has, in series circuit, a warning light 107 or any other suitable warning means, which is usually placed upon the instrument board in the pilot compartment.

The body 86 has a bore 108 allowing the diaphragm 93, upon its upper side, to be subjected to the ambient pressure and all variations thereof, consequently any adjustment of the spring 90 is reflected in a given pressure differential necessary, in the chamber 99 and on the underside of the diaphragm 93, to move the pusher rod 91 and the operating stem 103, of the microswitch 101, to upward position thereby establishing an electric circuit within the conductors 104 and 105 and operating the signalling means 107. In Fig. 7, the hot air conduit 60 has a gate means 110 slidably mounted within a gate carrier 111 into which it can be manually pushed in order to stop any air circulation through the conduit 60. The gate 110 is shown in open position. In the manual operation, of the invention, the automatic signalling means Fig. 6, and the manually operated valve means Fig. 7 would replace the automatic valve means Figs. 4 and 5.

In Figs. 8 and 9, I show a diagrammatic embodiment of the invention and call particular attention to the construction of the heater 120 which comprises a section of an exhaust pipe 121 encircled by a tube 122 having an inside diameter greater than the outside diameter of the exhaust pipe 121 and thereby providing what I term a safety chamber. The ends, of the tube 122, are welded to the exhaust pipe 121 as indicated at 123 thereby making a pressure tight safety chamber 124.

Mounted upon the tube 122 is another tube 126, which is welded thereto as indicated at 127, providing an air heating chamber 128 therebetween and through which an air circulation is maintained, between the cold air inlet 129 and the hot air outlet 130, by some suitable means such as an air scoop or so.

The heat flow path is first, through the tube wall 121, second, through the safety chamber, third, through the tube wall 122 and then into the air heating chamber 120. In my practice, of the invention, I utilize certain extended conductive heat transfer surfaces, within the chambers 124 and 128, and have thereby greatly increased the heat transfer of such heaters, but since the present invention is irrelevant thereto, I have, for purposes of simplicity, omitted the same.

Communicating with the safety pressure chamber 124 is a pressure conduit 133 to which pneumatic pressure is fed, by means of the pressure reducing valve 20, from a suitable source of pneumatic pressure, such as an air compressor or a cylinder 134 (shown) containing compressed air or any other suitable gas or vapor under pressure. Certain volatile liquids, having proper characteristics, may also be employed to generate the necessary vapor pressure. Positioned, between the pressure reducing valve 20 and the pressure conduit 133, is a restrictor tube 135 having such bore and length that the reduced pressure, passing from the pressure reducing valve 20 and through the restrictor tube 135, can only flow at some certain maximum flow rate with a given pressure differential between the outlet conduit 136, of the pressure reducing valve 20, and the pressure conduit 133.

Having described the components, I shall now describe the operation as an assembly. Referring to Fig. 8, the inlet, of the pressure reducing valve, is under some certain pneumatic pressure, say 500 lbs. The valve 20 is adjusted to maintain some certain reduced pressure, fed to the conduit 136, say 4 lbs. This 4 lb. pressure now passes through the restrictor tube 135 and into the pressure conduit 133, the safety chamber 124, the pressure relief valve 40 and the pressure chamber 80 of the automatic valve operator 65. Since the system is presumably leak proof, the 4 lb. pressure becomes static and the pressure reducing valve 20 automatically closes. The selected 4 lb. pressure is presumptively in excess of any pressure within the exhaust pipe 121 and due to the expulsion of exhaust gases therethrough.

The air plane engine is now started up and the exhaust pipe may reach a temperature of 1600° F. Obviously, the air, within the safety chamber 124, becomes greatly heated and expands. The original 4 lb. pressure may rise to several times that value unless we can bleed off some of the same. We adjust the pressure relief valve 40 for say 6 lbs. Whenever the pressure exceeds 6 lbs., the valve 40 bleeds off some of the air pressure. Whenever the pressure decreases below 4 lbs., the valve 20 feeds more air.

The main reason for limiting maximum air pressure, within the safety chamber is due to the fact that exhaust pipes are made of very thin materials and operate at exceedingly high temperatures during which the physical strength is greatly reduced. If for some reason or other the valve 20 should not seat tightly, the air pressures would eventually become sufficient to certainly collapse the exhaust pipe, unless we employ the pressure relief valve 40 or some equivalent.

With the airplane still grounded and the engine then shut off, the temperatures of the exhaust pipe 121 approaches the ambient temperature, the air, in the safety chamber 124, cools and contracts, the pressure recedes from 6 lbs./sq. in. to slightly under 4 lbs./sq. in. and the pressure reducing valve opens to maintain the 4 lbs./sq. in. pressure.

During all this time the airplane has been grounded and the ambient pressure (assuming sea level) was 14.7 lbs./sq. in. Now we shall assume that, after the engine is warmed up, the plane takes off. As the flight altitude increases, the ambient pressure decreases and the pressure relief valve 40 continually bleeds off the pressure, to constantly maintain the 6 lbs./sq. in. pressure differential between the upper and lower sides of the diaphragm 51 of the pressure relief valve 40.

During the descent, of the plane, the ambient pressure continually increases and finally the pressure differential between the upper and lower sides of the diaphragm 29, of the pressure reducing valve 20, reaches a value slightly under 4 lbs./sq. in. and the valve 20 opens and continuously feeds air to the system in order to constantly maintain the 4 lbs./sq. in. pressure differential to which it is adjusted.

It is assumed, in the particular instance, that the valve operator 65 is so adjusted that a pneumatic pressure of 3 lbs./sq. in maintains the butterfly valve 63 in wide open position. Whenever the pressure decreases, below 3 lbs./sq. in., the valve operator 65 then closes the butterfly valve 63 (as shown) and no heated air can pass into the cabin.

If the walls of the chamber 124 become punctured, for any reason whatsoever, the pneumatic pressure, within the various elements of the system, rapidly drops since the volumetric flow, through the restrictor 135, is of a very small order and incapable of supplying a sufficient volume, of pneumatic pressure, to maintain the predetermined 4 lbs./sq. in. pressure.

While the drawings show and the specification explains a particular embodiment of the invention, it is to be understood that various modifications may be employed without departing from the spirit and scope of the invention, which is to be limited only to the hereto appended claims.

I claim:

1. A hot air heating system utilizing the exhaust gases from an internal combustion engine as a source of heat, comprising: a pipe through which exhaust from the engine flows; a wall surrounding said pipe defining a pressure-tight chamber heated by the exhaust in the pipe; a conduit for air to be heated; a wall defining a heating chamber around the wall of the air tight chamber, communicatively connected to the conduit, and through which a current of air is normally circulated to absorb heat from the air tight chamber prior to its discharge from the conduit, said air tight chamber having no communication with the air in the conduit and the gases in the pipe; means for maintaining a pneumatic pressure in said chamber above the pressure of the exhaust gases passing through the pipe; valve-means for controlling the delivery of air from said conduit; and pneumatic-means, automatically responsive to a predetermined drop in pressure in said air tight chamber for controlling the valve-means to cut off the delivery of air from the conduit.

2. A hot air heating system utilizing the exhaust gases from an internal combustion engine as a source of heat, comprising: a pipe through which exhaust from the engine flows; a wall surrounding said pipe defining a pressure tight chamber heated by the exhaust in the pipe; a conduit for the air to be heated; a wall defining a heating chamber around the wall of the air tight chamber, communicatively connected to the conduit, and through which a current of air is normally circulated to absorb heat from the air tight chamber prior to its discharge from the conduit, said air tight chamber having no communication with the air in the conduit and the gas in the pipe; means for maintaining a pneumatic pressure in said chamber above the pressure of the exhaust gases passing through the pipe, including a pressure reducing valve and restricted flow-means between the reducing valve and the pressure-tight chamber; valve-means for controlling the delivery of air from said conduit; and pneumatic-means, automatically responsive to a predetermined drop in pressure in said air tight chamber, for controlling the valve-means to cut off the delivery of air from the conduit.

3. A hot air heating system utilizing the exhaust gases from an internal combustion engine as a source of heat, comprising: a pipe through which exhaust from the engine flows; a wall surrounding said pipe defining a pressure tight chamber heated by the exhaust in the pipe; a conduit for air to be heated; a wall defining a heating chamber around the wall of the air tight chamber communicatively connected to the conduit, and through which a current of air is normally circulated to absorb heat from the air tight chamber prior to its discharge from the conduit, said air tight chamber having no communication with the air in the conduit and the gas in the pipe; means for maintaining a pneumatic pressure in said chamber above the pressure of the exhaust gases passing through the pipe, including a pressure reducing valve; valve-means for controlling the delivery of air from said conduit; pneumatic-means, automatically responsive to a predetermined drop in pressure in said air tight chamber, for controlling the valve-means to cut off the delivery of air from the conduit, and including a pressure relief valve.

4. A hot air heating system utilizing the exhaust gases from an internal combustion engine as a source of heat, comprising: a pipe through which exhaust from the engine flows; a wall surrounding said pipe defining a pressure tight chamber heated by the exhaust in the pipe; a conduit for air to be heated; a wall defining a heating chamber around the wall of the air tight chamber communicatively connected to said conduit, and through which a current of air is normally circulated to absorb heat from the air tight chamber prior to its discharge through the air outlet, said air tight chamber being in non-communicating relation with the air in the conduit and the gas in the pipe; means for maintaining a pneumatic pressure in said chamber above the pressure of the exhaust gases, including a pressure reducing valve, restricted flow-means between the reducing valve and said air tight chamber, and a relief valve; valve-means for controlling the delivery of air from said conduit; and pneumatic-means, automatically responsive to a predetermined drop in pressure in said air tight chamber, for controlling the valve-means to cut off the delivery of air from the conduit, said means including a conduit leading from the pressure relief valve.

ANTHONY F. HOESEL.